INVENTOR.
ERVIN J. SCHNEIDER
ATTORNEYS

Sept. 10, 1968  E. J. SCHNEIDER  3,400,636
PNEUMATIC CIRCUIT FOR RAPIDLY TRANSFERRING FLUID
UNDER PRESSURE FROM A WORK CYLINDER TO
A STORAGE TANK FOR SUBSEQUENT USE
Filed April 12, 1966  7 Sheets-Sheet 3

INVENTOR.
ERVIN J. SCHNEIDER

BY
Whittemore, Hulbert
& Belknap
ATTORNEYS

Sept. 10, 1968    E. J. SCHNEIDER    3,400,636
PNEUMATIC CIRCUIT FOR RAPIDLY TRANSFERRING FLUID
UNDER PRESSURE FROM A WORK CYLINDER TO
A STORAGE TANK FOR SUBSEQUENT USE
Filed April 12, 1966    7 Sheets-Sheet 5

INVENTOR.
ERVIN J. SCHNEIDER
BY Whittemore, Hulbert
& Belknap
ATTORNEYS

Sept. 10, 1968 E. J. SCHNEIDER 3,400,636
PNEUMATIC CIRCUIT FOR RAPIDLY TRANSFERRING FLUID
UNDER PRESSURE FROM A WORK CYLINDER TO
A STORAGE TANK FOR SUBSEQUENT USE
Filed April 12, 1966 7 Sheets-Sheet 6

INVENTOR.
ERVIN J. SCHNEIDER
BY
*Whittemore, Hulbert*
*& Belknap*
ATTORNEYS

Sept. 10, 1968 E. J. SCHNEIDER 3,400,636
PNEUMATIC CIRCUIT FOR RAPIDLY TRANSFERRING FLUID
UNDER PRESSURE FROM A WORK CYLINDER TO
A STORAGE TANK FOR SUBSEQUENT USE
Filed April 12, 1966 7 Sheets-Sheet 7

INVENTOR.
ERVIN J. SCHNEIDER
BY
ATTORNEYS

United States Patent Office 3,400,636
Patented Sept. 10, 1968

3,400,636
PNEUMATIC CIRCUIT FOR RAPIDLY TRANSFERRING FLUID UNDER PRESSURE FROM A WORK CYLINDER TO A STORAGE TANK FOR SUBSEQUENT USE
Ervin J. Schneider, 13970 Forrer Ave., Detroit, Mich. 48227
Filed Apr. 12, 1966, Ser. No. 542,072
12 Claims. (Cl. 91—452)

This invention relates to pneumatic circuits or systems and to pneumatic valves therefor. The invention includes various types of pneumatic circuits and valves adapted to transfer exhausted fluid or pneumatic energy from a work cylinder to an accumulator or storage tank for use at a later time or to a second work cylinder. In the past it has been the general practice of industry to exhaust the expended pneumatic energy from a work cylinder directly to the atmosphere. The present invention utilizes the previously exhausted pneumatic energy by storing same in a tank for subsequent use or by transferring the pneumatic energy directly to a second work cylinder for immediate use without interfering with the primary work cylinder. With such a construction the two work cylinders are operated independently of each other in a non-synchronized manner or relationship.

It has been the practice of industry as mentioned previously to exhaust the exiting pneumatic fluid from a cylinder directly to the atmosphere. In some cases the expended energy is used to blow out chips or parts in fixtures. In addition early steam engines utilized a high pressure piston and cylinder which exhausted the high pressure steam into a low pressure cylinder at a synchronized rate. The low pressure cylinder utilized approximately one-half of the stored energy in the high pressure cylinder rather than having the energy exhausted to the atmosphere as lost energy. The same type of system has been applied to air hammers which utilized high and low pressure piston and cylinder devices and has also been applied to turbine engines. Regardless of the application heretofore, all high and low pressure piston and cylinder devices operated in a synchronized manner.

However modern industry has not utilized any circuit or system for recovering the exiting pneumatic energy expended from a work cylinder. There are several reasons why industry has not attempted to utilize such a system. Heretofore the cost involved in utilizing a circuit having standard components to reclaim the energy was excessive when compared to the reasonable cost for purchasing and using compressed air. In addition there was no known circuit which was economical and efficient and required a minimum amount of maintenance.

However with the rapid increase in the costs of equipment, labor, and maintenance and due to other economic factors including the lack of adequate air capacity in many plants, and due to the increased use of pneumatic fluid as a motive force, it was determined that industry could economically and efficiently utilize various systems which reclaim or store exiting pneumatic fluid from a work cylinder rather than exhausting such fluid to the atmosphere as wasted energy.

The pneumatic circuits of the present invention have certain common characteristics and features. Each circuit includes means which transfers the exiting pneumatic fluid from the work cylinder to a storage tank or to a second work cylinder almost instantaneously in an unrestricted explosive or rapid manner and in a relatively short period of time measured in milli-seconds. The instantaneous transfer of the pneumatic fluid is accomplished by providing a means of flow controlling or speed controlling the work cylinder after the explosive air saving sequence has taken place. The speed of each work cylinder is always controlled by restricting the flow of the exhaust to the atmosphere. No attempt is made to store the pneumatic energy after it has passed through a flow control since such action would delay the response of the work cylinder. Each novel pneumatic circuit includes one or more fast acting fluid responsive valve means which are sequenced or actuated by one of three distinct methods: (a) pressure differential; (b) time delay; (c) velocity or flow and pressure.

It is an object of the present invention to provide a pneumatic circuit or system which utilizes exiting pneumatic fluid discharged or expended from a work cylinder.

Another object of the present invention is to provide a pneumatic circuit or system which transfers the exiting pneumatic fluid expended from a work cylinder to a storage tank almost instantaneously in a period of time measured in milli-seconds.

Still another object of the present invention is to provide a pneumatic circuit or system which transfers the expended energy from a work cylinder to the storage tank without interfering with the speed and operation of the primary work cylinder.

A further object of the present invention is to provide a pneumatic circuit or system in which the instantaneous transfer of the pneumatic air from the work cylinder to the storage tank is accomplished or characterized by an explosive type of action.

A still further object of the present invention is to provide a pneumatic circuit comprising a work cylinder and piston assembly having a pair of pressure ports, a primary source of pneumatic fluid under pressure, a directional control valve interposed in the circuit between the source and the ports of the cylinder, a pneumatic fluid storage tank establishing a secondary source of pneumatic fluid under a pressure less than the pressure of the primary source, flow control means in the circuit for controlling the speed of the piston, and fast acting fluid responsive valve means located in the circuit between the ports of the cylinder and the storage tank, said valve means being responsive to fluid exiting from the cylinder to thereby transfer the exiting pneumatic fluid from the work cylinder to the storage tank, the transfer of such pneumatic fluid occurring almost instantaneously in a brief period of time measured in milli-seconds upon actuation of the valve means and being accompanied by an explosive action, the remaining exiting pneumatic fluid under pressure used in controlling the valve means being exhausted to atmosphere through the flow control means immediately after the explosive action has occurred.

Another object of the present invention is to provide a pneumatic circuit in which the speed or flow controlling of the high pressure work cylinder takes place after the unrestricted explosive transfer of the expended pneumatic energy from the work cylinder to the storage tank.

Another object of the present invention is to provide a pneumatic circuit of the aforementioned type wherein the valve means and flow control means are located in the circuit on the upstream side of the directional control valve.

Still another object of the present invention is to provide a pneumatic circuit of the aforementioned type wherein the valve means and the flow control means are located in the circuit on the downstream side of the directional control valve.

A further object of the present invention is to provide a pneumatic circuit of the aforementioned type wherein the valve means is responsive to the pressure of the fluid exiting from the work cylinder.

A still further object of the present invention is to provide a pneumatic circuit of the aforementioned type wherein the valve means is responsive to the velocity of the pneumatic fluid exiting from the work cylinder.

A further object of the present invention is to provide a pneumatic circuit of the aforementioned type wherein the valve means is responsive to the pressure differential between the primary source of fluid and the pressure of the fluid exiting from the work cylinder.

A still further object of the present invention is to provide a pneumatic circuit of the aforementioned type wherein the valve means is responsive to a time delay or to a flow condition measured in time.

A still further object of the present invention is to provide novel fast acting fluid responsive valves for use in energy saving pneumatic circuits.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

Figures 1, 2, 3, 4, 5:
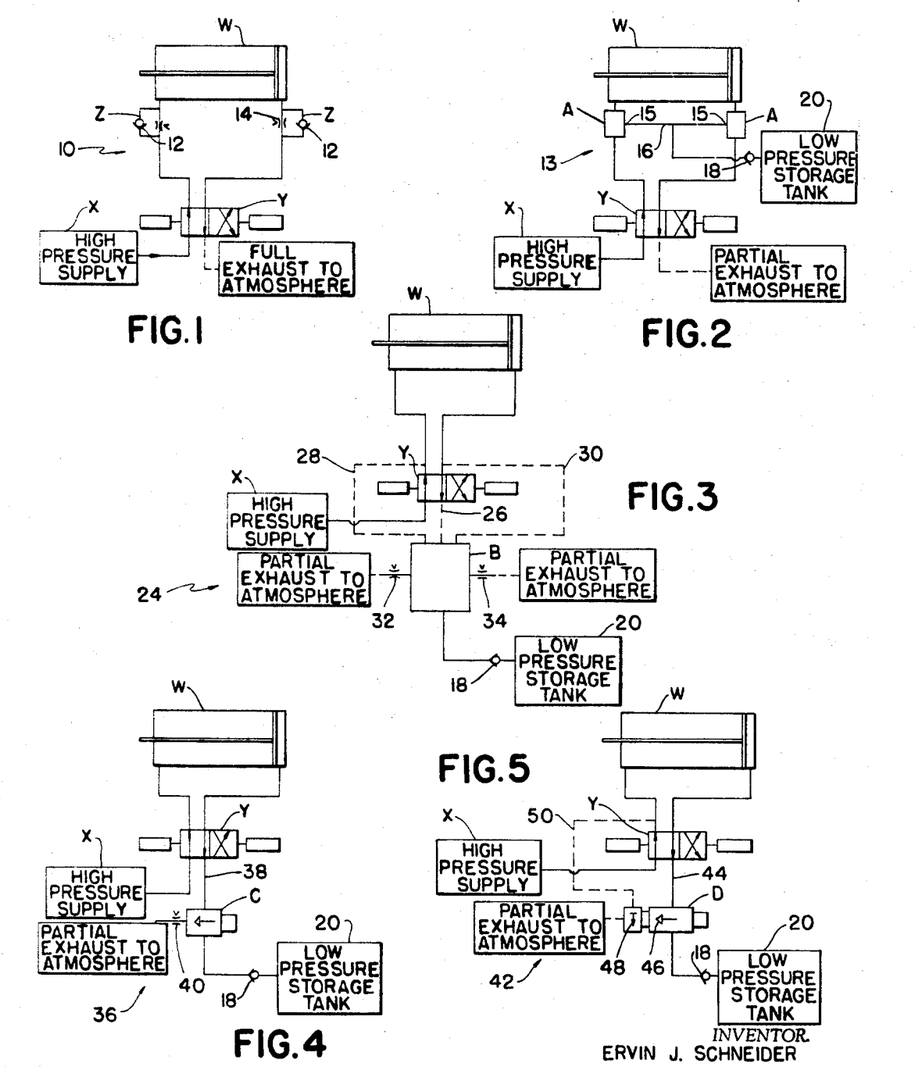
FIGURE 1 is a schematic view of a conventional pneumatic circuit wherein all of the exiting pneumatic energy expended from a work cylinder is exhausted to atmosphere.
FIGURE 2 is a schematic view of one embodiment of a novel pneumatic circuit for storing exiting pneumatic energy expended from a work cylinder.
FIGURE 3 is a schematic view of another embodiment of a novel pneumatic circuit for storing exiting pneumatic energy expended from a work cylinder.
FIGURE 4 is a schematic view of a still another embodiment of a novel pneumatic circuit for storing exiting pneumatic energy expended from a work cylinder.
FIGURE 5 is a schematic view of another embodiment of a pneumatic circuit for storing exiting pneumatic energy expended from a work cylinder.

Sheet 1 of the drawings including FIGURES 1–5 inclusive illustrates diagrammatic views of pneumatic circuits. FIGURE 1 is a conventional pneumatic circuit while FIGURES 2–5 inclusive represent novel pneumatic circuits incorporating the feature of flow or speed controlling the high pressure work cylinder after the explosive transfer of the expended pneumatic energy from the work cylinder to the storage tank as occurred. Where applicable the same letter and numerical designations are used to designate similar or equivalent components or parts.

The conventional pneumatic circuit illustrated in FIGURE 1 is designated by the numeral 10 and includes a high pressure work cylinder and piston assembly designated by the letter W, a high pressure source or supply designated by the letter X, and a four way directional control valve designated by the letter Y. Interposed between the inlet and outlet ports of the work cylinder W and the four-way directional control valve Y are a pair of flow control devices designated by the letter Z. The directional control valve Y may take various forms it being understood that the valve may be operated by solenoids or electrically, manually, pneumatically or by other means well known in the art.

Referring once again to FIGURE 1, it should be observed that air under pressure from the supply X is directed through one port of the four-way control valve Y and across the one way acting ball check 12 of the flow control Z and into the left chamber of the work cylinder W so as to move the piston to the right to the position shown in FIGURE 1. At such time the pressure in the right chamber of the work cylinder W is forcibly urged out of the right hand chamber across the restriction 14 of flow control Z and through the flow control valve Y where the entire quantity of the expended air is exhausted to atmosphere. It should be noted that each of the flow control valves Z permits free flow into the high pressure work cylinder W and restricts the flow from the cylinder W to exhaust. It will be appreciated that by permitting free flow of air into the work cylinder W and restricted flow of fluid out of the work cylinder W will determine and control the speed of the piston in the work cylinder W. Air cylinders of the type just described are controlled by a directional control valve. When the cylinder is in one position the cylinder rod and piston are extended and when in the other position the cylinder rod and piston are retracted.

It will further be appreciated that the speed at which the piston moves in the cylinder is controlled by a flow control valve which restricts the flow of air out of the cylinder port but allows free flow or full flow of air into the cylinder. With such a construction the flow control valve Z is always located between the cylinder W and the directional control valve Y as illustrated in FIGURE 1.

It is well known that compressed air is stored energy and flows from a high level or pressure to the low level or pressure just like water. Air will flow from a high pressure chamber to a low pressure chamber until both pressures are equal at which point the flow ceases. The greater the pressure differential the higher is the rate of flow, with air flow being measured in c.f.m. (cubic feet of air per minute). As an example, a one inch directional flow control valve and 80 p.s.i. supply pressure will permit a flow of approximately 150 c.f.m. at 4 pounds pressure drop and 425 c.f.m at 30 pounds pressure drop. Therefore when a piston in a cylinder has traveled from the retracted position to the extended position there is trapped a stored volume of compressed air or pneumatic energy. If the pressure is 80 p.s.i. then the compressed energy can be used to operate another cylinder of equal volume at 40 p.s.i. (When the second cylinder has traveled to its limits both cylinders will show a 40 p.s.i. gage pressure).

It will also be appreciated that the size of pipes also has a direct bearing on flow with a ⅜" valve permitting a flow of approximately 40 c.f.m. at 4 pounds pressure drop and a flow of 125 c.f.m at 30 pounds pressure drop. Heretofore when a pair of cylinders are located in a circuit a very impractical condition results since the first cylinder is delayed in its action or response until the second cylinder has traveled through its limiting stroke. In addition the rate of fluid flow from the first cylinder to the second cylinder is high at the start since the pressure drop would be from 80 p.s.i. gage to zero. However as soon as both cylinders approach the 40 p.s.i. point the fluid flow is very very slow. This fact is another important reason why industry has not utilized for subsequent work a system which utilized pneumatic fluid expended from a work cylinder.

The novel circuit illustrated in FIGURES 2–5 inclusive illustrates workable systems which overcome many of the heretofore stated disadvantages and which provide many economical features and efficient operations which lend themselves to the modern day requirements of industry.

FIGURE 2 illustrates a novel pneumatic circuit 13 which includes a work cylinder W, high pressure supply X and the four-way directional control valve Y illustrated in FIGURE 1. Interposed in the circuit 13 adjacent the cylinder ports are fast acting fluid responsive valves A and A' which will be more adequately described when discussing FIGURES 9–12 inclusive. It should be appreciated that the valves A and A' replace the flow control devices Z aforesaid of FIGURE 1. The valves A and A' are identical and are located in the circuit 13 on the upstream side of the directional control valve Y adjacent the ports of the cylinder W. Each valve A and A' has an integral flow control unit therein, with each valve operating on a pressure differential principle determined by the difference between the pressure of the primary source of fluid X and the pressure of the fluid expended from the work cylinder Y.

Each valve A and A' is provided with an exhaust port 15 leading into a common exhaust line 16 which is in turn provided with a one-way check valve 18 adjacent a low pressure storage tank or accumulator 20. The valves A and A' permit unrestricted flow from the source of pressure X, control valve Y to the work cylinder W. In addition, each valve A and A' transfers the exhausted pneumatic fluid from the respective work chamber of the cylinder W to the storage tank 20 for subsequent use. With such a construction as will be more adequately explained in connection with FIGURES 9–12 inclusive a small part of the exhausted pneumatic fluid from cylinder W is utilized to help establish the differential pressure for operating the valves A and A'. Such exhausted pneumatic fluid forming part of the control pressure is exhausted to atmosphere through the exhaust port of the four-way directional control valve Y as best illustrated in FIGURE 2 after passing through the flow control unit in valve A or A'. The integral flow control units control the speed of the cylinder W.

It will be appreciated that the transfer of pneumatic fluid from the work cylinder W to the storage tank 20 occurs almost instantaneously and is accompanied or characterized by an explosive type of action. In order for the pneumatic circuit 13 to function properly the work cylinder W must function in normal sequence without any delay in the time cycle thereof. An important feature of the present invention is that the transfer of the compressed air energy, which is to be stored, must take place in a relatively short period of time measured in milli-seconds. For this reason the air must be stored by an explosive action. Each valve A or A' operates on a pressure differential basis. Two valves are required for each work cylinder. One valve is located in each cylinder line between the directional control valve Y and the cylinder W. Each valve A or A' can be separately adjusted for independent flow control characteristics.

FIGURE 3 illustrates a novel pneumatic circuit 24 which contains a work cylinder W, a source of pressurized fluid X and a four-way directional control valve Y. Interposed in the exhaust line 26 is a fast acting fluid responsive valve unit B, the features of which will be more adequately described in discussing FIGURE 13. Pilot lines 28 and 30 connect the cylinder lines between the cylinder W and control valve Y with the valve elements in valve unit B so as to control flow and to control the required sequential operations. Separate flow controls 32 and 34 cooperate with valve unit B to control the speed of the piston in cylinder W. The valve unit B operates on the pressure differential principle as described in connection with FIGURE 2. The valve unit B is fast acting and practically instantaneously responsive to the differential pressure to permit the expended pneumatic fluid to be transferred from cylinder W to the storage tank 20 in a period of time measured in milli-seconds, with such transfer being accompanied by an explosive type of action. The control fluid exiting from cylinder W is exhausted to atmosphere through flow controls 32 and 34 immediately after the explosive action has occurred in order to speed or flow control the cylinder W.

From the foregoing it appears that valve B of circuit 24 operates on a pressure differential basis and that only one valve B is required for each work cylinder W. The conventional control valves Z are omitted or if used are moved to a wide open position in the conventional air control circuit, with valve B connected into the exhaust of the directional control valve Y. Means are provided for allowing the explosive air savings sequence to take place prior to flow or speed controlling the work cylinder W. Two separate independent flow control conditions are accomplished by using air pilot lines from the directional control valve Y to the fast acting fluid responsive valve B. The air pressure from the directional control valve Y determines which flow control function will take place. With such a construction it is possible to independently control the extended and retracted speeds of the work cylinder W.

The pneumatic circuit 36 in FIGURE 4 includes a fast acting fluid responsive valve C on the downstream side of the four-way directional control valve Y which is located between the primary source of fluid X and the work cylinder W. The valve C is located in the exhaust line 38 of the directional control valve Y. The features of valve C will be explained when discussing FIGURES 14–18 inclusive. Valve C works on a velocity principle rather than on the pressure differential principle as in FIGURES 2 and 3. Valve C transfers the expended energy from cylinder W to the storage tank 20, with the residual expended energy for controlling valve C exhausted to atmosphere across the flow-control 40 after the explosive transfer of energy has occurred. The flow control 40 may be located outside of valve C, as shown, or inside the valve C. One flow control is provided for both the extended and retracted speeds of the work cylinder W.

Figures 14, 15, 16, 17, 18:
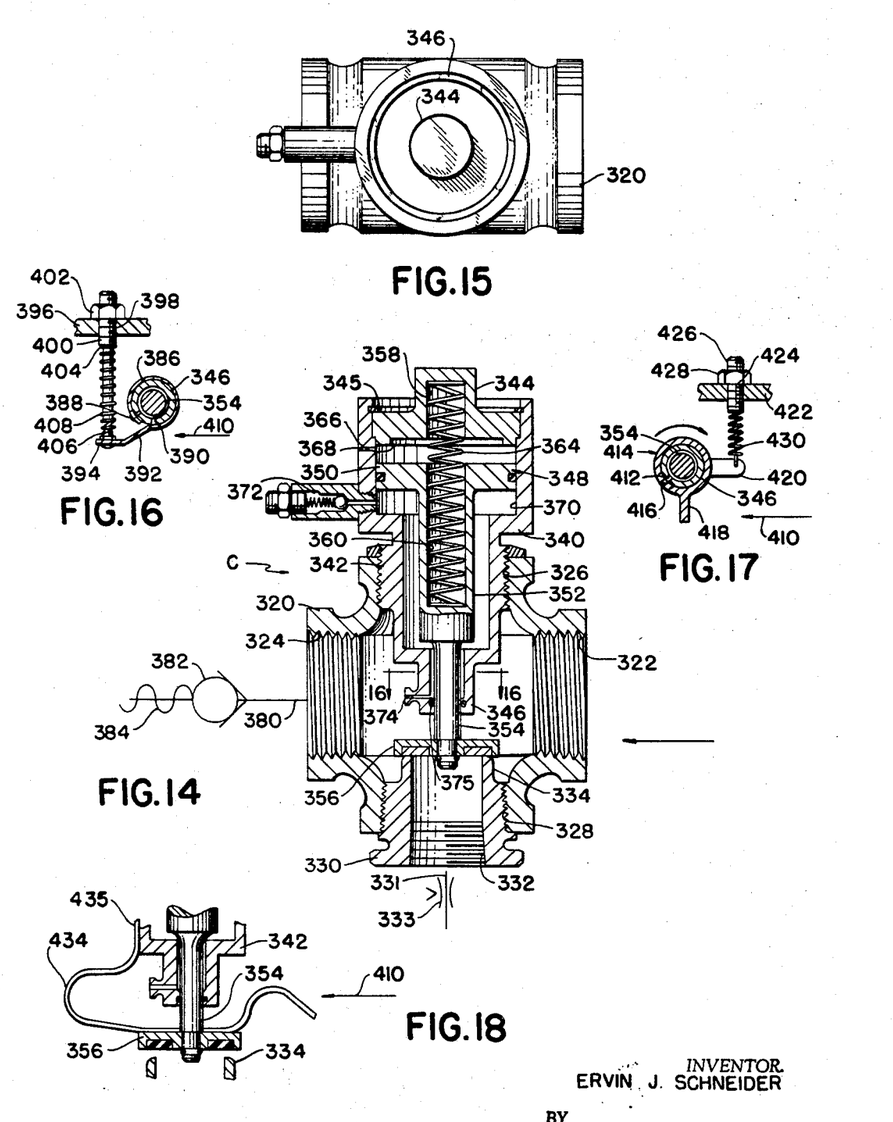
FIGURE 14 is a vertical sectional view of still another fluid responsive fast acting pneumatic valve of the type utilized in the circuit illustrated in FIGURE 4.
FIGURE 15 is a top plan view of the valve illustrated in FIGURE 14.
FIGURE 16 is a sectional view taken on the line 16—16 of FIGURE 14.
FIGURE 17 is a fragmentary view in section of a modified valve structure for use with the pneumatic valve illustrated in FIGURE 14.
FIGURE 18 is a fragmentary view in section of a modified valve structure for use with the pneumatic valve illustrated in FIGURE 14.

Valve C functions on a flow or flow versus pressure basis. The venturi method used in FIGURE 14 is dependent on a flow basis. Immediately after the explosive action takes place, the exhaust poppet or valve element is pulled off from its seat and the remainder of the air in the work cylinder W is exhausted to atmosphere. FIGURES 17 and 18 show different methods of accomplishing a flow-force condition as will be described in detail later on in the specification.

The pneumatic circuit 42 of FIGURE 5 includes a fast acting fluid responsive valve D in the exhaust line 44 of the four-way directional control valve Y. The valve D, which will be discussed in detail when describing FIGURES 19–21 inclusive, includes a poppet valve having an integral flow control tapered surface 46 and a secondary flow control 48. By controlling the distance the exhaust poppet pulls off its seat it is possible to flow control the exhaust air to atmosphere. This will occur immediately after the explosive action allows the air to pass rapidly through the check valve 18 and into the storage tank 20. The valve D further includes an adjustable orifice which makes it possible to delay the opening of the exhaust poppet by virtue of time instead of by air flow as is the case in FIGURE 4. The tapered poppet flow control 46 controls the extending speed of the piston in the cylinder W. A pilot line 50 connects the primary source of fluid to the secondary flow control 48 to control the retracting speeds of the piston in the cylinder W. The circuit 42 contains two independent flow controls 46 and 48 one for each direction of the piston in the work cylinder W.

Valve D is similar in construction to valve C except that provision has been made for establishing two independent flow control positions. With such a construction it is possible to control the speed of a work cylinder at different rates for the retracted position and the extended position. Valve D can also be actuated by the pressure flow system as utilized in valve C.

The valve D of circuit 42 functions even after the low pressure storage tank 20 is at a pressure equal to the pressure of the high pressure supply X.

Figure 6:
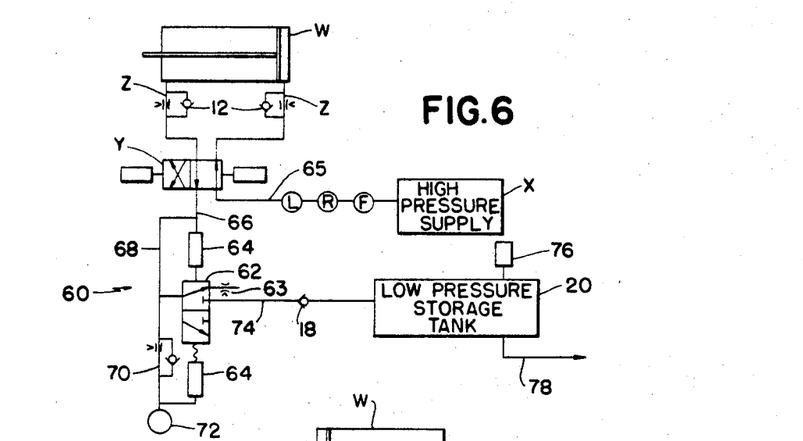
FIGURE 6 is a schematic view of a pneumatic circuit utilizing standard components for storing exiting pneumatic energy expended from a work cylinder.
Figure 7:
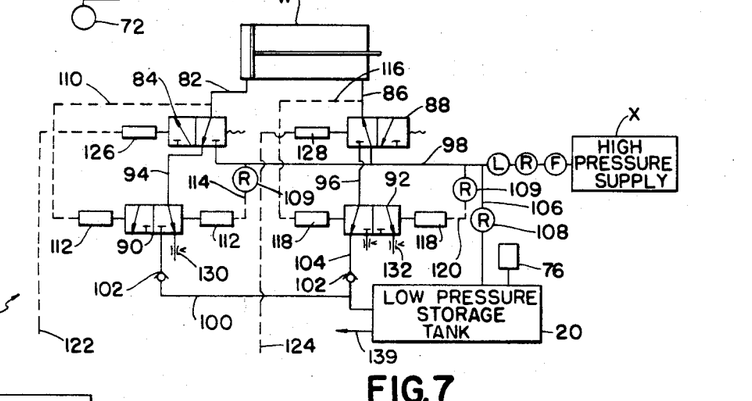
FIGURE 7 is a schematic view of another pneumatic circuit utilizing standard components for storing exiting pneumatic energy expended from a work cylinder.
Figure 8:
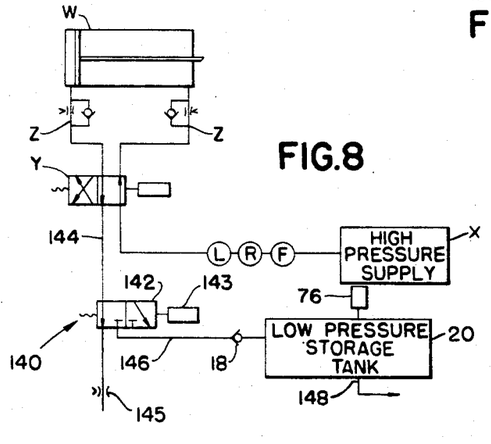
FIGURE 8 is a schematic view of still another pneumatic circuit utilizing standard components for storing exiting pneumatic energy expended from a work cylinder.

FIGURES 6–8 illustrate novel pneumatic circuits constructed with standard pneumatic valve components which are commercially available. FIGURE 6 includes the circuit of FIGURE 1 plus certain standard valves. The pressure supply X, work cylinder W, four-way directional control valve Y and flow control valves Z are arranged in the circuit 60 in a manner similar to the arrangement of FIGURE 1. The letters L, R, and F in the pressure supply line 65 designates a lubricator L, a regulator R and a filter F respectively as shown in FIGURE 6 and in other figures of the drawings. Such representations are conventional in the art. The circuit 60 further includes a second four-way directional control valve 62 having on opposite ends thereof a pair of pneumatic-spring valve actuators 64. The actuators 64 are located in a main air line 66 which includes a takeoff passage 68 which joins one of the valve actuators 64. Located in the take-off passage 68 is a flow control valve 70 and a pressure relief valve 72. The three-way directional control valve 62 has one port connected by a line 74 to the low pressure storage tank 20. The line 74 includes the usual check valve 18 while the tank 20 includes a pressure relief valve 76. The tank 20 includes a line 78 which is adapted to be connected to another work cylinder not shown, with line 78 forming a part of the low pressure system.

The circuit just described has been constructed and tested in the field and proven satisfactory under normal operating conditions. It is necessary to set flow control 70 to an appropriate fine adjustment in order to retain a repetitive action.

With the piston and rod of cylinder W retracted as shown in FIGURE 6 there is no exhaust air flowing through line 66 to actuate valve 62. In this condition control valve 62 is free to exhaust to atmosphere. As soon as control valve Y is actuated to extend the piston and rod (valve Y shown in this position in FIGURE 6) in cylinder W the exhaust air passes through line 66 and shifts the directional control valve 62 so that the exhaust air from control valve Y is transferred through line 74 and check valve 18 into the storage tank 20. The transfer of the expended pneumatic energy takes place in a brief period of time measured in milli-seconds and is accomplished in an unrestricted explosive manner. Simultaneously, a small amount of air passes through the flow control 70 to the adjacent pneumatic-spring valve actuator 64. If the air pressure exceeds the setting of relief valve 72 the relief valve will open and permit the pneumatic fluid to exhaust to the atmosphere. As soon as the high pressure exhaust air from the control valve Y is reduced to a predetermined valve determined by the pressure relief valve 72, the spring and air pressure in actuator 64 will return the control valve 62 to its starting position. At such time the remaining portion of the air in cylinder W will be exhausted to atmosphere through the exhaust port in control valve 62 and the flow control 63 for controlling the speed of the cylinder W in both directions.

FIGURE 7 illustrates a pneumatic circuit 80 including the work cylinder W. A rear cylinder line 82 connects one port of the cylinder W to the three-way directional control valve 84 while a front cylinder line 86 connects the other port of the work cylinder W to a three-way directional control valve 88. Both three-way control valves 84 and 88 are of the type identified as standard three-way normally opened air operated spring returned directional control valves. Circuit 80 further includes a pair of standard three-way air operated directional control valves 90 and 92. Valve 90 is located in the exhaust line 94 of control valve 84 while control valve 92 is located in the exhaust line 96 of control valve 88. The source of high pressure supply X is operatively connected to the cylinder ports of work cylinder W by means of a high pressure supply passage 98, control valves 84 and 88, and the lines or conduits 82 and 86. A low pressure supply line 100 having a check valve 102 therein leads from the control valve 90 to the low pressure accumulator tank 20 provided with a pressure relief valve 76. Another low pressure supply line 104 is interposed between the control valve 92 and the accumulator tank 20, said line 104 including a check valve 102. A make-up line 106 connects the high pressure supply line 98 to the accumulator tank 20, said line 106 having a low pressure compensator or regulator 108 therein in order to maintain minimum pressure.

The circuit further includes a pilot line 110 leading from the rear cylinder line 82 to the air actuator 112 of the control valve 90. A second pilot line 114 provided with pressure regulator 109 connects the high pressure supply line 98 to the other pneumatic actuator 112 of control valve 90. Pilot line 116 connects the front cylinder line 86 to the pneumatic actuator 118 of control valve 92 while still another pilot line 120 provided with pressure regulator 109 connects the high pressure supply passage 98 to the other pneumatic actuator 118 of control valve 92.

Additional pilot lines 122 and 124 lead from a source not shown which provides pilot signals to the air actuators 126 and 128 respectively of control valves 84 and 88 respectively.

It will be appreciated that the control valves 84 and 88 control the direction of the high pressure work cylinder W. control valves 90 and 92 direct the air control valves 84 and 88 respectively to the low pressure storage tank 20 or to exhaust through flow controls 130 and 132 which are located exteriorly of control valves 90 and 92 respectively.

When the high pressure cylinder W is in a retracted position as illustrated in FIGURE 7 control valve 88 supplies the primary source of fluid under pressure to the rod end of the cylinder W. At this time pilot line 116 is charged with high pressure air so as to direct high pressure fluid to one side of control valve 92. The pressure regulator 109 supplies low pressure air to the opposite side of control valve 92. Under these conditions air cannot escape through flow control 132 since the high pressure air in pilot line 116 blocks the exhaust port of valve 92. When control valves 84 and 88 are actuated to cause the cylinder rod to extend, the exhaust air from control valve 88 passes through line 96 to the inlet side of control valve 92 and out through line 104 and check valve 102 to the storage tank 20. The transfer of the expended pneumatic fluid from cylinder W to tank 20 takes place in an unrestricted explosive manner in a period of time measured in milli-seconds. As soon as the pressure in pilot line 116 drops below the setting of the pressure regulator 109, control valve 92 is shifted to permit the remainder of the air in the cylinder W to exhaust through the flow control 132. A relief valve 76 is provided in the low pressure tank 20 so that the pressure in the tank will not rise above the regulated pressure. The tank 20 is provided with a line 139 which forms a part of the low pressure system, not shown. The same sequence and action heretofore described in connection with control valves 88 and 92 also apply to control valves 84 and 90 when the piston rod is being retracted.

FIGURE 8 illustrates a pneumatic circuit 140 which includes the components W, X, Y, and Z of FIGURE 1. Circuit 140 further includes a normally closed three-way directional control valve 142 either air or electrically timed. The control valve 142 is located in the exhaust line 144. A low pressure supply line 146 connects the three-way directional control valve 142 to the low pressure storage tank 20 via the check valve 18. The tank 20 further includes a pressure relief valve 76 and a line 148 for connecting the tank 20 to the work cylinder of a low pressure system not shown.

When the directional control valve Y is actuated the air from the rod end of the cylinder W passes through the exhaust into the exhaust line 144. Simultaneously, the three-way valve 142 and the timing actuator 143 therefor are actuated so that the air in line 144 passes through the control valve 142 to the low pressure supply line 146 which in turn flows through check valve 18 to the storage tank 20. Such transfer of the expended pneumatic fluid from cylinder W to tank 20 takes place in an unrestricted explosive manner in a brief period of time measured in milli-seconds. After a predetermined period of time the actuator 143 returns the control valve 142 to its starting position and exhausts the remaining air in the rod end of cylinder W to the atmosphere via the flow control 145 for controlling the speed of the cylinder in both directions. The sequence and operation just described also applies when the rod and piston in cylinder W are retracted.

The pneumatic circuits in FIGURES 6–8 inclusive are each provided with means of flow controlling or speed controlling the work cylinder W after the explosive air saving sequence has taken place. The speed of each cylinder W in FIGS. 6–8 inclusive is always controlled by restricting, through means of a flow control, the exhaust fluid to the atmosphere.

Figure 9:
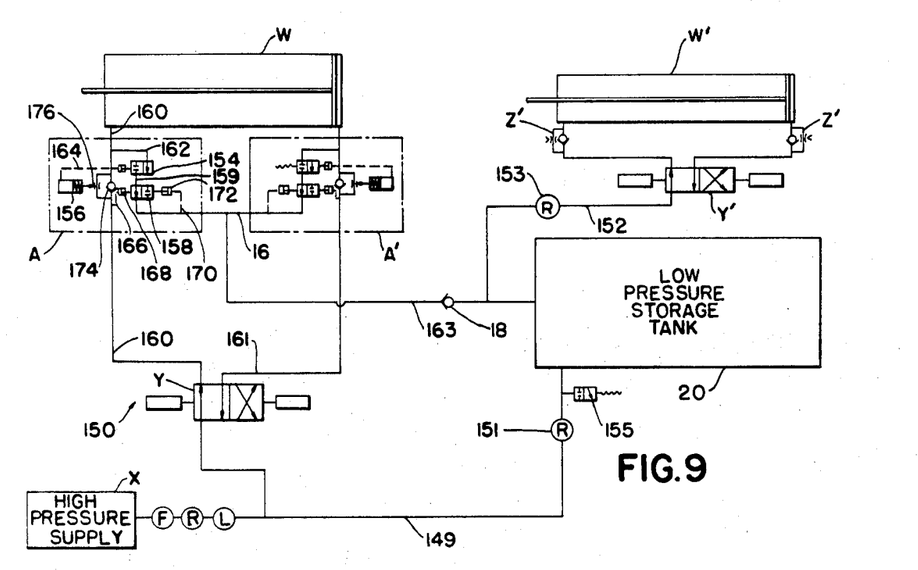
FIGURE 9 is a schematic view of another pneumatic circuit which is similar to the circuit illustrated in FIGURE 2 and wherein the exiting pneumatic energy is utilized to operate a second or low pressure work cylinder.

FIGURE 9 illustrates a pneumatic circuit of the type illustrated in FIGURE 2 of the drawings. The circuit designated by the numeral 150 includes all of the circuitry and components of FIGURE 2 and in addition includes a low pressure system which utilizes the pneumatic fluid in the low pressure storage tank 20. Where applicable the same numerical designations will be used to designate similar or equivalent parts. Circuit 150 includes the circuit 13 illustrated in FIGURE 2 including the low pressure line 16 interposed between the fast acting fluid responsive valves A and A' and the storage tank 20. The low pressure system includes a secondary work cylinder W', a four-way directional valve Y' and a low pressure supply line 152 which connects the supply line 16 with the cylinder ports of cylinder W' through the four-way control valve Y'. Located in the lines between the ports of cylinder W' and the four-way directional control valve Y' are flow control valves Z'.

The fast acting fluid responsive valves A and A' are shown schematically in FIGURE 9 for the purpose of explaining the functioning of such valves. Valves A and A' are identical and therefore the same numerical designations will be utilized. Valve A is provided with three valves including a pressure sensing straight-away valve 154, a pressure sensing metering valve 156 and a pressure sensing straight-away valve 158. The cylinder line 160 is connected to the valve 154 by a line 162. A pilot line 164 connects the main line 160 to the metering valve 156 while a pilot line 166 connects the main line 160 to the piston device 168 for actuating the valve 158. A pilot line 170 connects the aforementoned common exhaust line 16 between valves A and A' (FIGURE 2) to the piston actuator 172 of valve 158. A ball check 174 is located in the main line 160 with a flow control or metering orifice 176 connected to opposite sides of the check valve 174.

The aforementioned common exhaust line 16 is connected to the low pressure storage tank 20 via the main low pressure line 163 which is provided with the check valve 18. The low pressure line 152 aforesaid is connected on one end to the line or conduit 163 on the upstream side of the check valve 18 with the other end connected to the cylinder W' via the directional control valve Y' and flow control Z' as mentioned previously. A low pressure regulator 153 is interposed in line 152 between the check valve 18 and the directional control valve Y'.

The pneumatic circuit 150 includes a main supply make-up line or conduit 149 provided with a low pressure regulator 151 and a pressure relief valve 155. The make-up line 149 is connected between the high pressure supply X and the tank 20 as illustrated in FIGURE 9 to maintain the pressure in tank 20 at a predetermined minimum.

For purposes of explaining the system both cylinders W and W' are shown in the retracted position. The main supply line carries as an example 90 p.s.i.g. air. The low pressure regulator 153 maintains the pressure of cylinder W' at 40 p.s.i.g. Storage tank 20 is precharged with air as an example at 40 p.s.i.g. from the main supply line through the pressure regulator 151. Regardless of how many times cylinder W' is actuated relative to cylinder W the pressure in the storage tank 20 can never fall below 40 p.s.i. With such a construction the cylinder W' is entirely independent of the operation of cylinder W.

When the directional control valve Y is actuated to exhaust the air at 90 p.s.i.g. from supply line 160 and direct the air under pressure to the other main cylinder line 161, check valve 174 prevents the air trapped in the rod end of the cylinder W from exhausting through the directional control valve Y. At this time the flow control orifice 176 is sealed off by the pressurized fluid, as an example, 90 p.s.i.g., trapped in the valve 156. As a result thereof the spring 157 is compressed. Valve 154 is opened to allow flow through control valve 158 and through the line 159 joining such valves. Since the line pressure in line 166 has been exhausted, the air at 40 to 50 p.s.i.g. in pilot line 170 shifts valve 158 to allow the pressurized fluid at 90 p.s.i.g. to flow through the common exhaust line 16 and the conduit 163 to storage tank 20. As soon as the pressure in line 164 drops as an example to 55 p.s.i.g., the spring 157 in the metering valve 156 opens the flow control orifice 176 allowing the remainder of the air in the cylinder W to exhaust to atmosphere through the directional control valve Y under controlled flow conditions.

While the above functions are taking place the pressurized fluid at 90 p.s.i.g. is supplied to valve A' by the control valve Y via the cylinder line 161. Since valves A and A' are the same all numbers utilized in connection with valve A will apply to valve A'. Referring now to valve A' it appears that the air at line pressure flows through cylinder line 161 and check valve 174 to the blind end of the cylinder W causing it to extend after the flow control 176 is opened in valve A. Simultaneously, flow control 176 is sealed in valve A'. Flow through metering valve 154 is opened to valve 158 and the air at 90 p.s.i.g. is blocked at valve 158 from transferring to the storage tank 20 by the pneumatic pressure in line 161 acting on the piston in valve 158. This condition remains until the directional control valve Y is actuated to exhaust the fluid in line 161. When the cycle is completed the same sequence follows in valve A' as was described heretofore in connection with valve A. Once the air is supplied to line 160, the preceding description and operation of valve A' takes place in valve A thus completing the cycle of cylinder W.

Since valves A and A' are set to exhaust through the flow control 176 when the pressure in cylinder W drops as an example to 55 p.s.i.g. and the pressure regulator 151 is set for 40 p.s.i.g., the flow or pressure drop from cylinder W to the storage tank 20 will be as an example a minimum of 5 p.s.i.g. With these settings the relief valve 155 is set at 45 p.s.i.g. so that the 5 p.s.i.g. pressure drop can be maintained at a minimum.

FIGURES 10, 10A–10F, inclusive, 11 and 12 illustrate the specific details of valves A and A' which are adapted to be used in circuit 13 of FIGURE 2 and in the system or circuit 150 of FIGURE 9.

Figures 10, 11, 12:
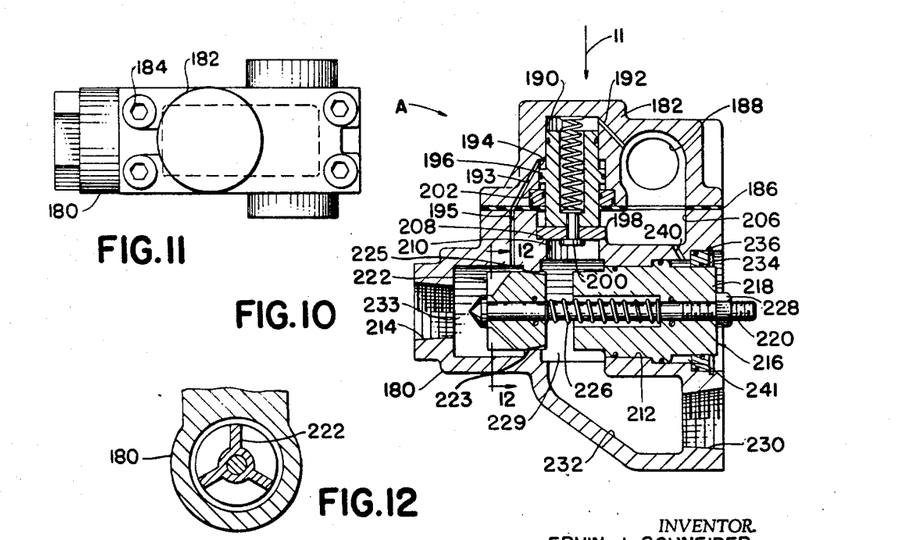
FIGURE 10 is a vertical sectional view through a fast acting fluid responsive pneumatic valve which is utilized in FIGURES 2 and 9.
FIGURE 11 is a top plan view of the valve illustrated in FIGURE 10.
FIGURE 12 is a fragmentary view, partly in section, taken on the line 12—12 of FIGURE 10.

Valve A comprises a housing including a valve body 180 and cover 182 which are connected by means of a plurality of fastening devices 184. A gasket 186 is interposed between the body 180 and cover 182 to prevent leakage from the housing. Cover 182 includes a pipe tapped port 188 and a piston chamber 190. A drilled passage 192 connects the top of chamber 190 to the port 188. Chamber 190 is enlarged at 194 and in which slides the piston 196. The piston 196 is hollow and includes on the bottom edge thereof a valve seal 198 which is connected thereto by means of a rivet or other suitable fastening devices 200. The piston 196 is held for sliding movement with the chamber 190 by means of a retainer ring 202. The valve body 180 includes a cored passage 206 in the upper surface thereof and an annular valve seat 208 surrounding a cored passage 210. A piston chamber 212 is provided which extends completely through the valve body 180 and terminates in a tapped port 214 and a cored passage 233. A piston assembly 216 is located in the cored passage or chamber 212 and comprises a hollow piston 218 through which extends an adjusting screw or rod 220. Located on the inner end of the rod 220 is an integral tapered check valve and flow control device 222 which is adapted to move relative to the rod 220. A spring 226 is interposed between the piston 216 of check valve 222. A lock nut 228 is provided on the outer end of the rod 20 in order to adjust the stroke of the piston assembly 216 and to adjust the flow characteristics of the check valve and flow control device 222.

The valve body 180 further includes a port 230, a cored passage 232 which intersects the passage 212 aforesaid. The piston 218 is mounted in chamber 212 for limited lengthwise movement by means of a retaining ring 234 and snap ring 236. The integral check valve and flow control device 222 includes inclined surfaces 223 on the inner side thereof which define with the adjacent portion of the valve body 180 a variable orifice 225. A drilled hole 240 connects the cored passage 206 with the chamber 241 located on the back side of the piston 218. Drilled passage 193 in cover 182 connects chamber 194 with the drilled passage 195 in body 180. Passage 195 terminates or intersects cored passage 233.

Figure 10A:
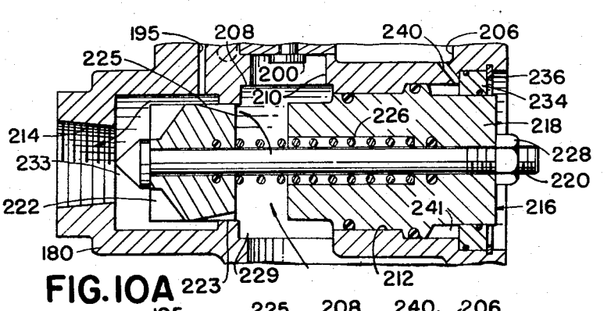
FIGURES 10A–10F inclusive are fragmentary vertical sectional views of the pneumatic valve of FIGURE 10, illustrating the movable valve element in various operating positions.
Figure 10B:
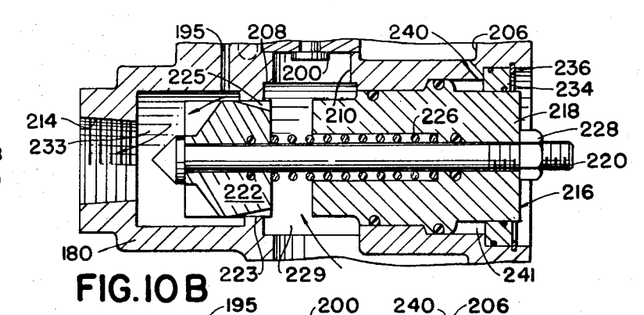
Figures 10C, 10D, 10E, 10F:
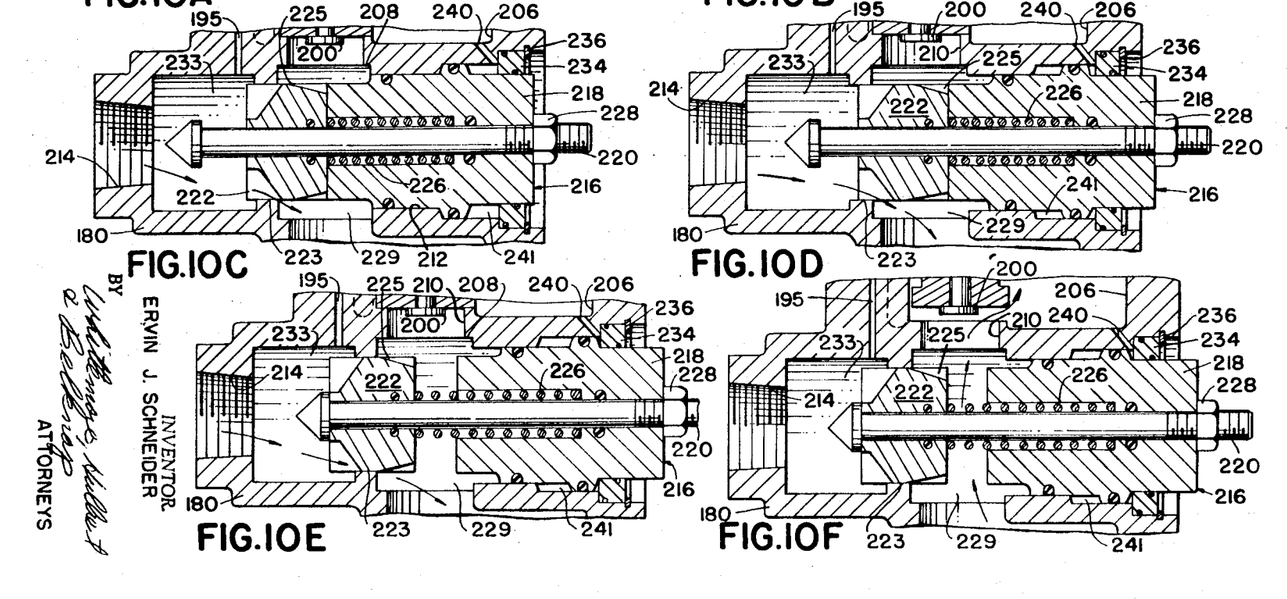

The valve A is illustrated in FIGURE 10A in its normal or rest position. The integral check and flow control device 222 can be moved to the right on the adjusting screw 220 thereby compressing spring 226 as shown in FIGURE 10C. Check valve 222 and piston assembly 216 can move to the right as shown in FIGURE 10D as one unit when spring 226 is compressed. The piston and valve assembly 196 and 198 can move vertically as shown in FIGURE 10F. It will be appreciated that the adjusting screw 220 can be adjusted to vary the controlled flow orifice size between operating limits from the maximum position of FIGURE 10A to the minimum position of FIGURE 10B. The tapped port 214 is connected to the directional control valve Y shown in FIGURE 9 while the tapped port 188 is connected to the accumulator tank 20. The tapped port 230 is connected to either the rod or blind end of cylinder W.

When the check and control device 222 is in the position shown in FIGURE 10A air flows from port 230 through cored passages 232, 229, and 233 to port 214 and out to the exhaust of control valve Y. When the poppet valve assembly 196 is moved off the seat 208 as shown in FIGURE 10F the air flows from port 230 through cored passages 232, 229, and drilled hole 210 to cored passage 206 and port 188 which is connected to the accumulator tank 20.

The air pressure in the accumulator tank 20 is constantly maintained in passage 206, drilled hole 192 and at the top of poppet valve 196 in chamber 190 at a value between 40 p.s.i.g. minimum and 45 p.s.i.g. maximum. This same pressure is maintained in chamber 241 on the piston assembly 216. The air pressure in ports 214 and 230, passages 233, 229, 210 and 232 and drilled holes 193 and 195 will vary from line pressure as an example 80 p.s.i. to zero depending entirely upon whether the directional control valve Y is supplying air to the cylinder W or exhausting same therethrough. When the directional control valve Y is supplying port 21r with air at line pressure, as an example, at 80 p.s.i., the check valve 222 moves to the right compressing the light spring 226 as shown in FIGURE 10C. At the same time air at line pressure is supplied to chamber 194 through holes 195 and 193. This results in the poppet valve assembly 196 being kept on the valve seat 208 to block hole 210. As a result thereof the air at line pressure in passage 229 cannot overcome the air pressure at 40 to 45 p.s.i. in chamber 190 at the top of the poppet valve assembly 196.

As soon as the pressure in chamber 233 increases sufficiently to overcome the opposing force in chamber 241, the check valve 222 and the piston assembly 216 moves to the right to the position shown in FIGURE 10D. This condition creates a full free flow area equal to the area of ports 214 and 230. The full volume of air is directed through port 230 to one end of the high pressure air cylinder W.

When the cylinder W has traveled to its extremities air flow from port 214 to port 230 ceases. The air in chambers 233, 229, 232, and 210 reaches line pressure (80 p.s.i.) at this time and remains at such pressure until the directional air control valve Y supplying port 214 is exhausted. Prior thereto spring 226 forces the check valve 222 to the left as shown in FIGURE 10F as soon as the air flow from port 214 to port 230 ceases. The air at line pressure is trapped in chambers 210, 229, 232, port 230 and the high pressure air cylinder W.

As soon the as the directional control valve Y supplying port 214 is exhausted, the pressure of the air in chamber 233, holes 193 and 195, and chamber 194 drops to zero. Simultaneously the fluid forces on the poppet valve assembly 196 acting through the hole 210 overcomes the force exerted by the air at 40 to 45 p.s.i. in the chamber 190. As a result thereof the poppet seal 198 is opened as shown in FIGURE 10F. At this instant the pressure of the air in chamber 229 is at 80 p.s.i. or line pressure. Since the pressure of the air in chamber 206 is only 40 to 45 p.s.i. there is a sudden flow of air from chamber 229 to 206. At this time piston assembly 216 is still in the right-hand position as shown in FIGURE 10F. As soon as the pressure of the air in chamber 229 drops to approximately 50 p.s.i., spring 191 and the air in chamber 190 forces the valve 198 to seat against the valve seat 208.

Simultaneously the pressure of the air in chamber 241 overcomes the force exerted by the pressure of the air in passage 229, causing piston assembly 216 to move to the left. At such time the check and flow device assumes the position shown in FIGURE 10A permitting the remaining air in the cylinder W to pass through port 214 and out the exhaust of the directional control valve Y under flow controlled conditions.

It will be appreciated that valve A is designed and constructed to permit the transfer of air under pressure from the work cylinder W to the storage tank 20, with such pneumatic transfer taking place in an explosive or rapid manner in a brief period of time measured in milli-seconds. This is accomplished by providing the flow controlling device 222 in order to flow control or speed control the work cylinder W, after the explosive air saving sequence has taken place. The speed of the work cylinder W is always controlled by restricting the flow of the exhaust air to the atmosphere across the variable orifice 225. As mentioned previously, valves A and A' each operate on a pressure differential basis.

Figure 13:
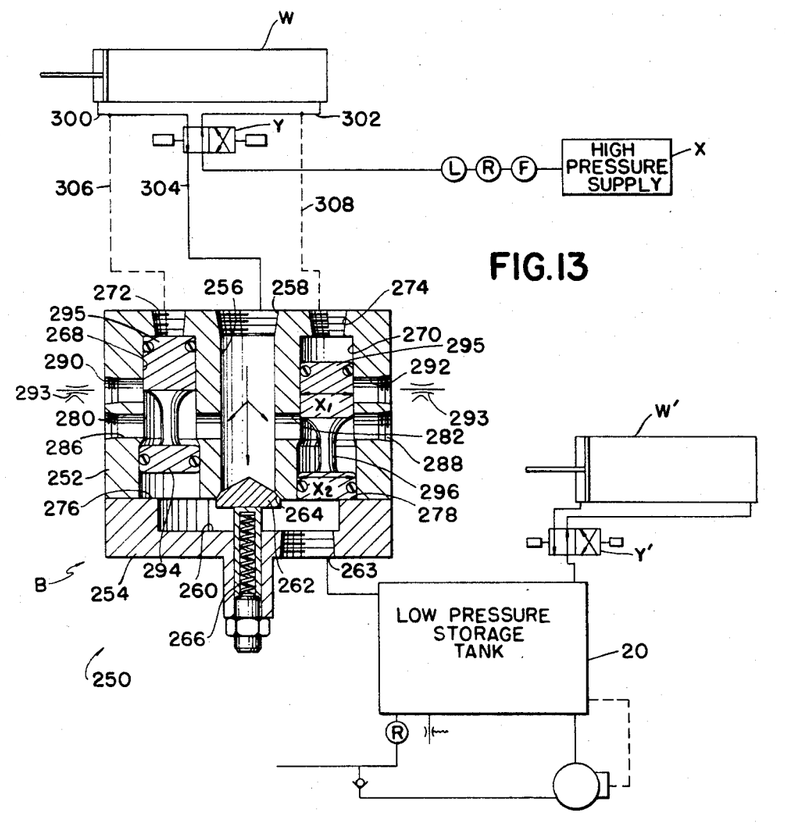
FIGURE 13 is a schematic view of another fast acting fluid responsive pneumatic circuit which is similar to the circuit illustrated in FIGURE 3, with the specific valve illustrated in section, and wherein the exiting pneumatic energy is utilized to operate a second or low pressure work cylinder.

FIGURE 13 illustrates a low pressure and high pressure system 250 which includes the circuit 24 of FIGURE 3. The work cylinder W is connected to the fast acting fluid responsive valve B through the four-way directional control valve Y. The valve B includes a housing having a valve body 252 and a cover 254 therein which is secured to the body 252 by means of a plurality of fastening devices not illustrated. The housing includes a centrally located passage 256 having a main port 258, with the trailing end of the passage 256 intersecting a manifold passage 260 provided in the cover 254. A check valve 262 is located in the housing at the intersection of the passages 256 and 260 and is urged against the valve seat 264 by means of a spring biased device 266. The housing further includes a pair of passages 268 and 270 arranged in parallel relationship on opposite sides of the centrally located passage 256. Passages 268 and 270 are provided with threaded ports 272 and 274 respectively. The other ends of the passages 268 and 270 are provided with stop abutment surfaces 276 and 278 respectively. Transversely extending ports 280 and 282 are provided in the housing to connect passage 256 with other passages 268 and 270 in the valve housing. It will be appreciated that the ports 280 and 282 are drilled in the valve body by means of a drill which provides a straight through passage 286. The outer ends of the passage 286 are provided with plugs 288 for closing same. The housing further includes exhaust ports 290 and 292 located on opposite sides of the housing. A flow control device 293 is located in each of the lines or conduits connected to the exhaust ports 290 and 292. Located in passages 268 and 270 are compound pistons 294 and 296 respectively.

The cylinder W includes a front cylinder line 300 and a rear cylinder line 302. An exhaust line 304 connects the exhaust port of the control valve Y with the centrally located passage 256 in the valve B. Pilot lines 306 and 308 connect the front and rear cylinder lines 300 and 302 respectively with the pilot ports 272 and 274 respectively.

If the directional control valve Y is actuated from the position illustrated in FIGURE 13 the cylinder rod of the work cylinder W will retract. As soon as the directional control valve Y is shifted, the air at line pressure passes through line 300 to the rod end of the piston in cylinder W. Simultaneously, the pressurized air passes through the pilot line 306 to the top of the piston or valve element 294 in passage 268. As a result thereof the piston 294 is shifted so that the upper land 295 thereon moves across the exhaust port 290 to block same. At such a time the land 295 on the piston 296 blocks the exhaust port 292 as illustrated. The exiting air under pressure from cylinder W passes through the exhaust line 304 and port 258 into passage 256. Since the exhaust ports 290 and 292 are blocked the check valve 262 is urged away from the seat 264 and the high pressure air from cylinder W passes through port 263 into the storage tank or accumulator tank 20 in a rapid and explosive manner. Pistons 294 and 296 are each provided with a larger diameter at the bottom thereof than at the top as shown by the diameters $X_2$ and $X_1$ respectively in FIGURE 13.

As soon as the pressure of the air in line 308 and port 274 drops to, as an example, 10 pounds greater than that in the low pressure tank 20, piston 296 moves upwardly toward port 274. As a result thereof the piston 296 opens the exhaust port 292 to exhaust across the flow control device 293. This movement is caused by the differential pneumatic forces on piston 296 due to the fact that the piston diameter $X_2$ is larger than the diameter $X_1$.

The piston in the cylinder W is now free to move to its retracted position under flow conditions determined by the aforementioned flow control device 293 located adjacent the exhaust port 292. Since there are no flow control restrictions between the cylinder W and the valve B the exiting air at a high pressure is transferred to the low pressure tank 20 with an explosive action prior to flow or speed controlling the cylinder W by means of the flow control device 293. The cycle or operation of the cylinder W is not delayed by the transfer of the exiting energy to the tank 20.

The same sequential action takes place when the rod and piston assembly in the cylinder W is being extended. At such time the speed of the cylinder W will be controlled by the flow control device 293 located adjacent the exhaust port 290 and the exhaust port 292 is blocked as shown in FIGURE 13. The low pressure energy in the accumulator tank 20 can be used to operate the low pressure cylinder W' in the conventional manner and independent of the work cylinder W. In other words, it is not necessary to synchronize the operation of cylinders W and W' as is required in prior art devices.

The valve B just described operates on a pressure differential basis and only one valve B is required for each work cylinder of the high pressure system. As in previous circuits means as heretofore described are provided for transferring the exiting air under pressure to the tank 20 in an explosive manner and in a brief period of time measured in milli-seconds prior to flow controlling the work cylinder W. Two separate independent flow control conditions are accomplished by using the air pilot lines 306 and 308. This air under pressure from the directional control valve Y determines which flow control function will occur and thus makes it possible to independently control the extending speed and the retracting speed of the work cylinder W.

FIGURES 14–18 inclusive illustrate various forms of valve C utilized in circuit 36 of FIGURE 4. Valve C functions on a velocity or flow and pressure basis.

The valve includes a hollow body 320 having an inlet port 322, and an outlet port 324. The top of the valve body 320 is provided with a threaded opening 326 while the bottom of the valve 320 is provided with a threaded opening 328. A tubular externally threaded element 330 is threadedly secured in the bottom opening 328 and defines an exhaust port 332. The top of the insert 330 defines an annular valve seat 334 which is in communication with the passage connecting the ports 320 and 322 as best illustrated in FIGURE 14. An external flow control device 333 is located in the line or conduit connected to the exhaust port 332.

A generally hollow cap 340 is provided with an intermediate externally threaded portion 342 which is mounted in threaded engagement with the threaded opening 326 in the top of the valve body 320. A closure element 344 is mounted in the top of the cap 340 and is held in locked position by means of a snap ring 345. The lower part of the housing or cap 340 includes a tubular extension or embossment 346. A piston assembly 348 is provided and includes a piston portion 350, a centrally located generally hollow stem 352 and a rod portion 354. The piston assembly 348 is located in the cap 340 with the rod portion 354 extending through the tubular extension 346. The lower end of the rod portion 354 extends through the bottom of the extension 346 and is provided with a valve element or seal 356 which is adapted to control flow across the annular valve seat 334. The closure element 344 is provided with a centrally located cavity 358 which is in longitudinal alignment with the cavity 360 provided in the stem 352 of the piston assembly 348. A spring 364 is located in the cavities 358 and 360 and biases the valve assembly 348 to the position illustrated in FIGURE 14.

The piston 350 divides the interior of the cap 340 into an upper chamber 366 which is vented to atmosphere by means of passage 368 and a lower chamber 370. A relief valve assembly 372 is in fluid communication with the lower chamber 370. The tubular extension 346 is provided with a venturi 374 which is in fluid communication with the chamber 370 due to the clearance provided between rod portion 354 and the tubular embossment 346 and the stem 352 and cap 340.

Exiting air from the high pressure cylinder W enters the inlet port 322. The velocity of the air creates a vacuum on the venturi 374 so that there is no pressure build up on the piston 350. As a result thereof the valve element 356 remains on the valve seat 334, thereby sealing the exhaust port 332. The exiting air passes through the outlet port 324 and the check valve 382 and the line 380 which is connected to the low pressure energy storage tank 20 illustrated in FIGURE 4. The adjustable spring 384 provided on check valve 382 establishes the pressure drop between the inlet 322 and the outlet port 324. As soon as the check valve 382 closes, air under pressure passes through the venturi 374 into the lower chamber 370 and forces the piston 350 upwardly thereby urging the valve element 356 away from the valve seat 334. At this time the remaining exiting air in the high pressure cylinder W is exhausted to atmosphere via the exhaust port 332 and the flow control device 333. Spring 364 exerts a force of approximately 8 to 10 pounds. With such an arrangement the back pressure in the cylinder W will never be greater than approximately one-half the spring force due to the large area of piston 350.

It should be understood that the exiting air from cylinder W is transferred to tank 20 in an explosive manner in a brief period of time measured in milli-seconds. The flow or speed controlling of the cylinder W takes place after the explosive action has occurred.

FIGURES 16 and 17 illustrate two modifications of part of the valve assembly illustrated in FIGURE 14. Rather than utilizing the venturi 374 other means may be provided which are responsive to the velocity of the air passing from inlet port 322 to the outlet port 324.

FIGURE 16 illustrates the rod portion 354 of the piston assembly 348 extending through the tubular extension 346. A leaf spring 386 is wrapped around the outer surface of the extension 346 and is secured on one end to the extension 346 by means of a fastening device 388. The extension 346 includes a generally radially extending passage or opening 390. The leaf spring 386 includes an annular portion which extends around the tubular extension 346 and is provided with a portion adapted to close the opening 390. Spring 386 includes an arm 392 provided with a generally flat base 394. The valve body 320 includes a mounting element or surface 396 provided with an internally threaded opening 398. An externally threaded rod or stem 400 is threadedly secured to the support 396 and is held in place by means of a nut 402. The rod 400 includes a shoulder 404. The base 394 of the spring 386 is provided with a stud 406. A spring 408 is interposed around the rod 400 in between the stop abutment 404 and the base 394 of the spring 386. With such a construction, the spring 408 biases the spring 386 in a direction to hold the spring 386 away from the opening 390.

In operation the velocity of the air flowing through the inlet port 322 in the direction of arrow 410 causes the leaf spring 386 to seal the opening 390 so as to prevent the air from entering chamber 370 to actuate the piston 350. As soon as the flow of air ceases or stops the spring 408 urges the leaf spring 386 in a direction to open the opening 390. As a result thereof air enters the opening 390 and flows into the chamber 370 so as to act upon the piston 350. Thereafter, the piston assembly 348 is moved upwardly so as to move the valve element 356 away from the valve seat 334. The opening of valve element 356 connects the inlet port 322 to the exhaust line or port 332. As soon as the back pressure of the air on the cylinder W drops, as an example, to less than 5 p.s.i. the valve element 356 closes and the fluid responsive valve C is ready for the next cycle. The effectiveness or spring force of spring 408 can be adjusted to regulated to vary the velocity force reaction time. As was described previously, the flow controlling of the work cylinder W takes place via flow control device 333 after the explosive transfer of the exiting fluid from the work cylinder W to the tank 20.

FIGURE 17 illustrates another modification. The rod portion 354 of the piston assembly 348 extends through the tubular extension 346 as in FIGURES 14 and 16. The tubular extension 346 is provided with a radially extending opening 412. A rotary valve 414 is sleeved over the extension 346 and is provided with a radially extending opening 416 which is in radially extending alignment with the opening 412. The rotary valve 414 includes a radially extending arm or blade 418 and a radially extending mounting arm 420. The valve body 320 includes a mounting structure 422 provided with an internally threaded opening 424. An externally threaded fastening element 426 is carried by the threaded opening 424 and is held in an adjusted position by means of a nut 428. A spring 430 is connected on one end to the threaded stud 426 and on the other end to the mounting arm 420 so as to bias the rotary valve 414 to the position illustrated in FIGURE 17, with the openings 412 and 416 in radially extending alignment.

Air traveling through the valve body in the direction of arrow 410 from the inlet port 322 to the outlet port 324 strikes the blade or arm 418 on rotary valve 414 so as to urge the valve 414 in a clockwise direction thereby moving the valve opening 416 out of engagement or alignment with the opening 412. At such time the valve 414 seals the opening 412. As soon as the flow of air stops the spring 430 returns the valve 414 to the position illustrated so that the air under preessure passes through openings 416 and 412 into the chamber 370 so as to act upon the piston 350. The effectiveness or spring force of spring 430 can be adjusted or regulated to vary the velocity-force reaction time and to vary the opening time of the valve. The aforementioned feature provides an effective time delay.

FIGURE 18 illustrates a further modification which can be utilized with the valve structures illustrated in FIGURES 14, 16 and 17. A leaf spring 434 is secured on one end 435 to the tubular housing or cap 340 with an intermediate portion thereof being secured to the valve element 356 so as to hold the valve element 356 away from the valve seat 334 as illustrated. The purpose of the leaf spring 434 is to hold the valve element 356 off from the valve seat 334 when the valve is in a neutral position. In operation the pressurized air under considerable velocity strikes the leaf spring 434 at the start of the cycle and exerts a downward force effective to urge the valve element 356 against the valve seat 334 thus sealing the exhaust port 332. The remaining portion of the cycle is the same as described in connection with FIGURE 14.

The relief valve assembly 372 can be used with any of the aforementioned actuators. If the venturi 374 is smaller than the exhaust hole in the relief valve 372, the venturi 374 can limit the action of the piston 350 to a preset low pressure.

In the event the annular O-ring or seal 375 should leak the relief valve 372 would prevent the piston 350 from moving until the pressure acting on it reaches a preset low pressure setting which would be controlled by the closing of the relief valve 372.

In view of the foregoing it should be appreciated that the various embodiments of valve C operate on a velocity or flow basis or on a flow versus pressure basis. The venturi method described heretofore is on a flow basis. Valve C utilizes only one flow control device 333 which speed controls the cylinder W after the explosive transfer of the exiting fluid from cylinder W to tank 20.

Figures 19, 20:
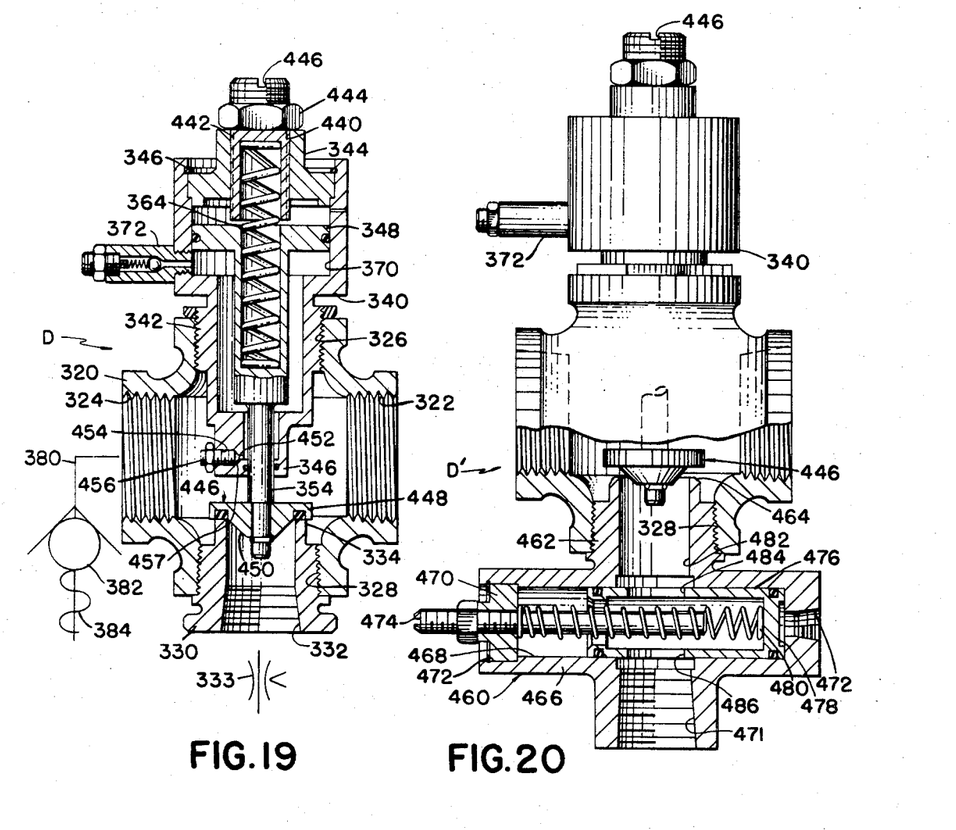
FIGURE 19 is a vertical sectional view through another novel fast acting fluid responsive pneumatic valve of the type utilized in the circuit illustrated in FIGURE 5.
FIGURE 20 is a front elevation partly in section of still another fast acting fluid responsive pneumatic valve of the type utilized in the circuit illustrated in FIGURE 5.
Figure 21:
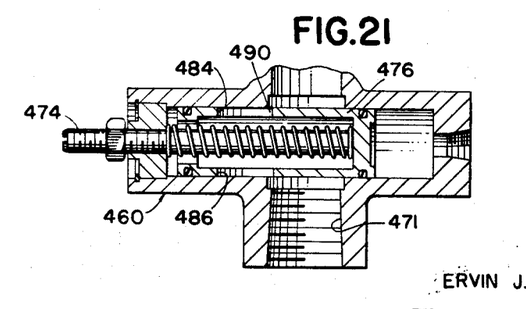
FIGURE 21 is a fragmentary view in section of the valve illustrated in FIGURE 20, with the flow control piston illustrated in a speed controlling position.

The valves D and D' illustrated in FIGURES 19 and 20 respectively may be utilized in the pneumatic circuit 42 illustrated in FIGURE 5. Valves D and D' are similar to the construction of the valve C of FIGURE 14 with the exception that provisions have been incorporated for establishing two independent flow control positions. With such a construction it is possible to control the speed of a work cylinder at different rates for the retracted position and the extended position.

Where applicable the same numerical designations will be utilized in FIGURES 19-21 inclusive as were used in connection with FIGURE 14. The closure 344 is provided with an internally threaded opening 440 which receives an externally threaded adjustable spring stop or element 442. The adjustable element 442 is threadedly secured in opening 440 and is held in place by means of a lock nut 444. The upper end of the element 442 is provided with a bayonet slot 446 to permit a person to limit or vary the stroke of the piston assembly 350 for flow controlling purposes.

The rod portion 354 of valve assembly 348 is provided with an integral valve element and flow control unit 446. Such unit includes an annular valve element or seal 448 adapted to seat against the valve seat 334 and a tapered flow control device 450. The unit 446 is held on the rod 354 by appropriate fastening means.

Another important provision in valve D is the provision of an orifice or opening 452 in the tubular extension 346. The extension 346 is provided with an internally threaded passage 454 in which is located an adjustable externally threaded needle valve 456. The needle valve 456 may be adjusted so as to increase the area of the opening 457 between the needle valve 456 and the orifice 452.

The adjustable orifice 452 provides a means to delay the opening of the valve element 448 by virtue of time instead of by air flow as is provided in the system illustrated in FIGURE 14. By increasing the area of the opening 457 between the needle valve 456 and the orifice 452 the amount of time required to actuate the piston assembly 348 will be reduced. By reducing the area of the opening 457 the response time will be delayed or increased.

It will be appreciated that the adjusting screw or element 442 provides a means for controlling the stroke of the piston assembly 348. By controlling the distance the exhaust poppet or valve element 448 pulls off the seat 334 it is possible to flow control the exhaust air to atmosphere. It will be appreciated that the flow controlling action will occur after the rapid and explosive transfer of the exiting air from the cylinder W to the storage tank 20.

The valve D' of FIGURE 20 includes the essential parts and components of valve D with the exception that the insert or element 330 has been eliminated. A flow control unit 460 is provided with an externally threaded nipple 462 which is screw threaded into the threaded opening 328. The nipple 462 is provided with the valve seat 464 which cooperates with the integral valve element and flow control unit 446. The flow control unit 460 includes a housing 466 provided with a chamber or passage 468. The housing 466 includes an exhaust port 471 which is in fluid communication with the chamber 468. The housing 466 further includes a pilot port 472 at one end of passage 468. Located at the opposite end of the passage 468 is a retainer 470 which is held in place by means of a snap ring 472. The retainer 470 carries an externally threaded piston stroke adjusting screw 474 which extends through an opening provided in the retainer 470 into the chamber 468. Also located in the chamber 468 is a hollow piston 476 which extends around the adjusting screw 474. The piston 476 includes a closed end 478. A spring 480 is interposed in the chamber 468 between the piston end 478 and the inner surface of the retainer 470.

The nipple 462 includes an internal passage 482 which is in alignment with the exhaust port 471. The piston 476 includes a pair of ports 484 and 486 which are in alignment with the passage 482 and exhaust port 471 when the piston 476 is located at the end of the passage 468 adjacent the pilot port 472. FIGURE 20 illustrates the valve element and flow control unit 446 in the primary flow control position.

If the extended and retracted speeds of an air cylinder W can be controlled by one flow control unit then the tapered poppet or flow control 450 of FIGURE 19 can be adjusted to perform this function. It will also be appreciated that this function can be accomplished with an external flow control valve as is illustrated by the optional flow control unit 333 in FIGURE 19. If the external flow control 333 is utilized it would not be necessary in certain applications to provide or utilize the tapered poppet or flow control 450 or the adjustable stop screw 442.

In many applications it is necessary to control the extended and retracted speeds of a work cylinder separately as provided for in FIGURE 20. When this is required the tapered poppet 450 and the adjusting screw 442 are set to provide for the fastest stroke or primary flow control. The slower speed of the cylinder W is accomplished by having a secondary flow control unit 460 as illustrated in FIGURES 20 and 21. FIGURE 20 illustrates the primary flow control unit 446 functioning by itself with the exhaust ports 484 and 486 wide open in longitudinal alignment with the passage 482 and the exhaust port 471 to connect the fluid flow to exhaust or atmosphere. Such an arrangement is designed for the fastest stroke of the work cylinder W.

In retracting the piston in the work cylinder W, equivalent to the slowest stroke of cylinder W, the piston 476 is shifted to the left by means of the pressurized air delivered through the directional control valve Y to the pilot port 472. As a result thereof the piston 476 is moved to the left until the piston end 480 abuts the opposite end of the threaded screw 474 as illustrated in FIGURE 21.

The area of the exhaust ports 484 and 486 is reduced considerably to provide the restriction 490 for the flow of the exhaust air to the secondary system. The poppet or valve element 446 is always open to its primary control position for both the extended and retracted position of the work cylinder W. With such a construction only one pilot line is required which connects the port 472 to the directional control valve Y as illustrated in FIGURE 5.

The position of the tapered poppet unit 446 controls the speed of the fastest stroke of the work cylinder W and the restricted opening 490 of ports 484 and 486 in the piston 476 as shown in FIGURE 21 controls the speed of the slowest stroke of the work cylinder W. If the retracted stroke of the work cylinder W is to be the slowest then the applicable pilot line is connected to the appropriate cylinder line to provide the necessary force to retract the cylinder W. This connection would be made between the directional control valve Y and the work cylinder W as shown in FIGURE 5.

As in the other embodiments the valves D and D' each includes means for flow controlling the cylinder W after the explosive and rapid transfer of the exiting fluid from cylinder W to the storage tank 20.

Figure 22:
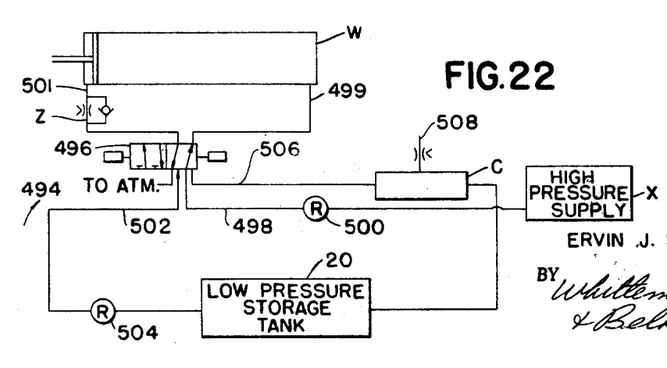
FIGURE 22 is a schematic view of a high and low pressure pneumatic circuit incorporating features of the present invention.

FIGURE 22 illustrates still another pneumatic circuit 494. The circuit 494 includes a work cylinder W, a source of high pressure fluid X, a flow control valve Z and a low pressure storage tank 20. The circuit 494 further includes a 4-way-5 port directional control valve 496. The control valve 496 includes two supply ports and two exhaust ports. It should be appreciated that two three-way directional control valves can be utilized in place of the valve 496.

The supply X is connected by a high pressure line 498 through the control valve 496 and cylinder line 499 to the piston end of the cylinder W. A pressure regulating valve 500 is interposed in the high pressure line 498 between the directional control valve 496 and the supply X. The rod end of the work cylinder W is connected through the cylinder line 501 across the flow control Z and directional control valve 496 to a low pressure line 502 which is connected to the storage tank 20. The low pressure line 502 is provided with a pressure regulating valve 504. In addition cylinder line 499 is connected through control valve 496 to a pressure line or conduit 506 which is connected to storage tank 20. The line 506 is provided with a fast acting fluid responsive valve which may take the form of valve C of FIGURE 14 or valve D of FIGURE 19. The valve C or D as the case may be is provided with an external flow control 508.

In operation when valve 496 is energized and is moved to the right the piston end of cylinder W is connected through cylinder line 499 and control valve 496 to the pressure line 506. The low pressure storage tank 20 is in turn connected through low pressure line 502, control valve 496 and the cylinder line 501 to the rod end of the cylinder W so as to move the piston and rod assembly in cylinder W to the right as viewed in FIGURE 22.

At such time it will be appreciated that the fluid exiting from the piston end of cylinder W is transferred in an explosive manner to the storage tank 20 as was described previously in connection with valves C and D.

When the piston rod assembly is moved in an extended direction to the left as viewed in FIGURE 22, the left end of the work cylinder W is connected through the cylinder line 501, flow control Z, and control valve 496 to atmosphere. The right end of the work cylinder W is in turn connected to the source of high pressure X through high pressure line 498, control valve 496 and the cylinder line 499.

It will be appreciated that the work cylinder W of pneumatic circuit 494 operates at two different speeds determined by the flow control units. It will further be appreciated that the pressure regulating valves 500 and 504 located in the high pressure line 498 and the low pressure line 502 respectively maintained the pressure in such lines at a predetermined value.

In conclusion, all of the various pneumatic systems described herein include one basic feature and that its means are incorporated in each circuit which permits the air energy to be saved or to be transferred to the accumulator or storage tank in an explosive or rapid manner. This is accomplished by providing a means of flow controlling or speed controlling the work cylinder after the explosive air saving sequence has taken place. The speed of the work cylinder is always controlled by restricting the flow of the exhaust air to the atmosphere. It is not advisable to store the air energy after it passes through a flow control since such a process could delay the response of cycle time of the work cylinder.

The drawings and the foregoing specification constitute a description of the improved pneumatic circuit for rapidly transferring fluid under pressure from a work cylinder to a storage tank for subsequent use in such full, clear, concise and exact terms as to enable any person skilled in the art to practice the invention, the scope of which is indicated by the appended claims.

What I claim as my invention is:

1. A pneumatic circuit comprising a work cylinder and piston assembly having a pair of pressure ports, a primary source of pneumatic fluid under pressure, a directional control valving means interposed in the circuit between said source and the ports of said cylinder, a pneumatic fluid storage tank establishing a secondary source of pneumatic fluid under a pressure less than the pressure of the primary source, flow control means in said circuit for controlling the speed of said piston, and fast acting fluid responsive valve means located in said circuit between the ports of said cylinder and said storage tank, said valve means being responsive to fluid exiting from the cylinder and alternately connecting the ports of said cylinder to said storage tank to thereby transfer exiting pneumatic fluid from the work cylinder to said storage tank in an explosive manner, the transfer of such pneumatic fluid occurring almost instantaneously in a brief period of time measured in milli-seconds upon actuation of said valve means, the remaining exiting pneumatic fluid under pressure used in controlling said valve means being exhausted to atmosphere through said flow control means immediately after the explosive action has occurred to speed control said piston.

2. The pneumatic circuit defines in claim 1 wherein two valve means and two flow control means are provided, with one of each of said means located in each line of the circuit connecting one pressure port of the cylinder to the directional control valving means, and an intermediate line connecting the discharge ports of the valve means to said storage tank, each valve means being responsive to the pressure differential between the primary source of pneumatic fluid and the pressure of the fluid exiting from the work cylinder, with the remaining exiting pneumatic fluid used in controlling such valve means exhausted to atmosphere through the corresponding flow control means immediately after the explosive action has occurred.

3. The pneumatic circuit defined in claim 1 wherein two valve means and two flow control means are provided, with one of each means forming a unit, each unit being located in the exhaust line of said directional control valving means, and a line connecting the discharge ports of said valve means to said storage tank, each valve means being responsive to the pressure differential between the primary source of pneumatic fluid and the pressure of the fluid exiting from the work cylinder, with the remaining exiting pneumatic fluid used in controlling such valve means exhausted to atmosphere through the corresponding flow control means after the explosive action has occurred.

4. The pneumatic circuit defined in claim 1 wherein valve means and one flow control means are located in the exhaust line of said directional control valving means, and a line connecting the discharge port of said valve means to said storage tank, said valve means being responsive to the velocity and related pressure forces of the pneumatic fluid exiting from the work cylinder, with the remaining exiting pneumatic fluid used in controlling said valve means exhausted to atmosphere through said flow control means after the explosive action has occurred.

5. The pneumatic circuit defined in claim 1 wherein one valve means and two flow control means are located in the exhaust line of said directional valving means, a line connecting the discharge port of said valve means to said storage tank, one of said flow control means being connected to said valve means for controlling the extending speed of the piston in said cylinder, the other of said flow control means controlling the retracting speed of the piston in said cylinder, with the remaining exiting pneumatic fluid exhausted to atmosphere through said other flow control means after the explosive action has occurred, said valve means being responsive to the pressure or velocity of the fluid exiting from the cylinder.

6. The pneumatic circuit defined in claim 1 wherein said valve means and flow control means are located in said circuit on the upstream side of said directional control valving means.

7. The pneumatic circuit defined in claim 1 wherein said valve means and said flow control means are located in said circuit on the downstream side of said directional control valving means.

8. The pneumatic circuit defined in claim 1 wherein said valve means is responsive to the pressure of the fluid exiting from the work cylinder.

9. The pneumatic circuit defined in claim 1 wherein said valve means is responsive to the velocity of the pneumatic fluid exiting from the work cylinder.

10. The pneumatic circuit defined in claim 1 wherein said valve means is responsive to the pressure differential between the primary source of fluid and the pressure of the fluid exiting from the work cylinder.

11. The pneumatic circuit defined in claim 1 wherein said valve means is responsive to a flow condition measured in time.

12. The pneumatic circuit defined in claim 1 wherein said directional control valving means comprises one or more directional control valves.

References Cited

UNITED STATES PATENTS

| | | | |
|---|---|---|---|
| 1,123,678 | 1/1915 | Burlingham | 91—155 |
| 2,618,243 | 11/1952 | Treganowan | 91—33 |
| 2,665,667 | 1/1954 | Tolkien | 91—164 |
| 2,952,267 | 9/1960 | Reis | 137—115 |
| 3,163,985 | 1/1965 | Bouyoucos | 60—51 |
| 3,205,659 | 9/1965 | Hartzell | 60—51 |
| 3,294,104 | 12/1966 | Mercier | 137—115 |
| 2,944,400 | 7/1960 | Ashton | 60—52 |

MARTIN P. SCHWADRON, *Primary Examiner.*

B. L. ADAMS, *Assistant Examiner.*